May 15, 1951 — H. A. RAHMEL — 2,552,585
APPARATUS FOR DETERMINING LISTENING HABITS OF RADIO RECEIVER USERS
Filed Jan. 9, 1947
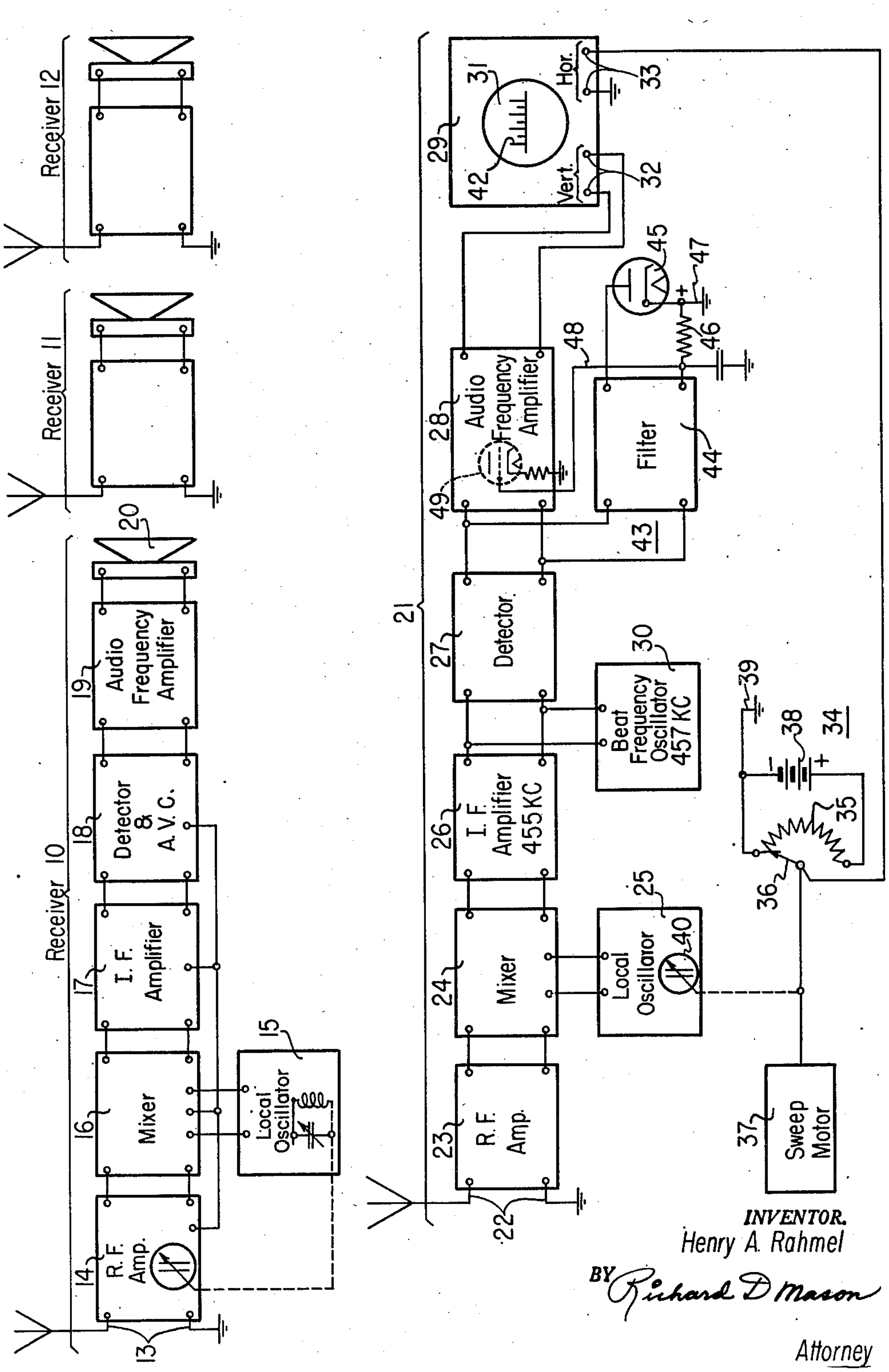
INVENTOR.
Henry A. Rahmel
BY Richard D Mason
Attorney Patented May 15, 1951 2,552,585

UNITED STATES PATENT OFFICE 2,552,585

APPARATUS FOR DETERMINING LISTENING HABITS OF RADIO RECEIVER USERS

Henry A. Rahmel, Evanston, Ill., assignor to A. C. Nielsen Company, Chicago, Ill., a corporation of Illinois Application January 9, 1947, Serial No. 721,049

2 Claims. (Cl. 250—6)

The present invention relates to systems and apparatus for determining the listening habits of radio receiver users and more particularly, to an arrangement or means entirely disassociated from either the radio receivers, the listening habits of whose users are to be determined, or from the broadcasting stations to which these receivers might be tuned.

In recent years, it has become increasingly important for radio advertisers to be able to determine the listening habits of radio users to analyze the effectiveness of the radio advertising. Numerous schemes have been employed for this purpose. These schemes have included calling selected ones of the radio audience by telephone to determine what program they are listening to at the moment, employing post cards asking certain selected radio users to tell what stations they listened to the preceding night for example, or actually ringing the doorbells of selected homes to determine what radio stations are being listened to. All of these schemes have an obvious disadvantage in that the cooperation of the radio user is required and, of course, many radio users object to being called on the telephone, to answering the doorbell, or to filling in a post card for this purpose. In still another scheme for analyzing the listening habits of radio receiver users, attachments have been provided on a selected group of receivers which include recording apparatus to record how the receiver is tuned over particular periods. This again requires consent of the radio receiver user to apply the apparatus to his receiver, and in addition, requires periodic contacting of the receiver to obtain the record made by the apparatus as to the listening habits of the users of that receiver. This last mentioned scheme is, however, quite accurate and has many advantages over the schemes enumerated above. It would be desirable, however, to provide a scheme having the accuracy of the last mentioned of the above schemes without requiring any attachment to the radio receiver or any cooperation of the user of the radio receiver.

Accordingly, it is an object of the present invention to provide a new and improved arrangement for determining the listening habits of radio receiver users.

It is another object of the present invention to provide an arrangement for determining the listening habits of radio receiver users without in any way bothering the user of the radio receiver or applying any apparatus to either the receiver or the radio broadcasting station with which the receiver is tuned.

It is still another object of the present invention to provide an arrangement for determining the listening habits of radio receiver users in which a single device is capable of determining to what stations a whole series of radio receivers in the immediate vicinity are tuned.

It is a feature of the present invention to provide a wave signal receiver capable of being tuned to the unmodulated signal put out by the local oscillators of radio receivers in nearby homes which are being used, together with means for determining by the receipt of the unmodulated signals from such local oscillators, to what stations the particular receivers are tuned at the time.

Further objects and advantages of the present invention will become apparent as the following description proceeds and the features of novelty thereof will be pointed out with particularity in the claims annexed to and forming a part of this specification.

For a better understanding of the present invention, reference may be had to the accompanying drawing in which the single figure thereof comprises a block diagram of a plurality of radio receivers together with a wave signal receiver capable of determining the listening habits of the users of the receivers first referred to without requiring any cooperation on the part of the users nor attachments or the like on the receivers.

It is a well known fact that substantially all modern radio receivers in extensive use today are of the so-called superheterodyne type. By that is meant that the frequency of the incoming signal is changed to a new radio frequency, namely the intermediate frequency, which intermediate frequency is obtained by means of the hetrodyne process. In other words, the frequency is changed by combining the radio frequency with the output of an adjustable local oscillator generally referred to as the high frequency oscillator. The radio frequency signal and the output of the local oscillator are combined in a mixer or converter stage of the receiver often referred to as the first detector stage. To produce a beat frequency equal to the intermediate frequency such receivers usually employ a uni-control tuning arrangement. Whether the tuning arrangement comprises gang condensers or permeability tuning such uni-control tuning comprises the adjustment of reactances in several stages of the receiver including the local oscillator stage whereby the frequency of the local oscillator is changed as the frequency of the radio signal is changed to maintain constant the intermediate frequency signal. The superheterodyne receiver has decided advantages in that the intermediate frequency signal obtained at the output of the mixer or first detector stage is constant regardless of the particular station to which the receiver is tuned thus simplifying the amplification stages following the first detector stage. The present invention is primarily concerned with the fact that the local oscillator or the high frequency oscillator, as it is often called, of a superheterodyne receiver produces an unmodulated signal which can be received by a suitably designed wave signal receiver. Furthermore, this unmodulated signal produced by the local oscillator of a superheterodyne receiver varies in frequency in dependence upon the particular radio station to which the receiver employing such local oscillator happens to be tuned. As will become apparent from the following description, there is provided a wave signal receiver capable of receiving the output signal of one or more local oscillators of superheterodyne receivers whereby it is possible to determine at a distance from the various receivers, what stations those receivers are tuned to at any particular instant.

Referring now to the drawing, there are illustrated a plurality of receivers designated as 10, 11, and 12, all shown in block diagram. These receivers are those disposed in the homes of various radio users. The particular construction of these receivers is of no interest as far as the present invention is concerned except that they are of the superheterodyne type. Preferably all of these receivers are substantially identical as far as the basic elements thereof are concerned, and receiver 10 is representative of such receivers comprising an antenna stage 13, a radio frequency selector and amplifier stage 14, a local oscillator 15, a mixer stage 16 which also may be termed the first detector stage, an intermediate frequency amplifier stage 17, a detector and automatic volume control stage 18, an audio frequency amplifier stage 19, and a signal reproducer or loud speaker stage 20, which except for the local oscillator 15, are connected in tandem in the order named. The local oscillator 15 is connected to the mixer stage wherein the high frequency signal produced by the local oscillator and the radio frequency signal received by the antenna 13 are mixed to produce a beat frequency which is constant regardless of the radio station to which the receiver is tuned, which beat frequency is generally referred to as the intermediate frequency.

In accordance with the present invention there is provided a wave signal receiver generally designated as 21 for picking up and identifying the energy radiated by the local oscillators of home receivers such as 10, 11, and 12 while being remote from such home receivers and requiring no collaboration of the receiver users. The wave signal receiver 21 is adapted to be disposed exteriorly of the homes being studied and with no disturbance to the people in the studied homes whose radio listening habits it is desired to determine. It will be understood that the wave signal receiver 21 could be a permanent installation in a selected neighborhood capable of determining the radio listening habits of radio users within a selected area from the permanent installation, the area being determined by the range of the wave signal receiver 21 in receiving the unmodulated signals from the local oscillators of superheterodyne receivers such as 10, 11, and 12, in the neighborhood. On the other hand the wave signal receiver 21 could be associated with a portable or mobile installation, as for example when disposed on a truck or the like, which could be driven to selected areas to determine exteriorly of the homes the radio listening habits of the users of the radios living in those homes. Instead of a permanent installation or a temporary or mobile installation as referred to, it will be apparent to those skilled in the art that a semi-permanent installation might be made.

To receive the output of the high frequency local oscillators 15 of the superheterodyne receivers such as 10, 11, and 12, disposed in homes adjacent to the location of the wave signal receiver 21, the latter comprises either a directional or a non-directional antenna circuit generally designated at 22. If the antenna circuit 22 is a directional antenna circuit it is preferably of loop form so that it may be beamed at a particular home to determine what radio stations are being listened to at particular times during the hours of radio broadcasting. On the other hand the antenna circuit 22 may comprise a non-directional type of antenna such as the familiar whip type of antenna as used for vehicular radio installations in which case the antenna would be capable of receiving all unmodulated signals generated by the high frequency local oscillators of superheterodyne receivers within a predetermined range of the wave signal receiver 21.

Preferably, the wave signal receiver 21 is a superheterodyne receiver comprising a radio frequency selector and amplifier stage 23, a mixer stage 24, a local oscillator stage 25, an intermediate frequency amplifier stage 26, a detector stage 27, an audio frequency amplifier stage 28, and a signal indicating device generally designated at 29, all connected in tandem in the order named with the exception of the local oscillator 25, which is connected to the mixer stage 24 in a well known manner.

It is a well known fact that the so-called standard broadcast band for radio broadcasting employs radio frequencies between 550 and 1650 kilocycles. In superheterodyne receivers today, it is common practice for the intermediate frequency to be of the order of 455 kilocycles. To obtain this, it is apparent that the local oscillators of superheterodyne receivers such as the receivers 10, 11, and 12, would have their local oscillators tunable to generate frequencies between about 1000 to 2000 kilocycles so that the different frequencies between the radio frequencies of the standard broadcast band will produce a constant intermediate frequency of 455 kilocycles. It is apparent that such an unmodulated signal as is produced by a local oscillator of the superheterodyne receivers such as 10, 11, and 12, which may have a frequency in the range between 1000 to 2000 kilocycles, is not audible to the human ear. In order to produce an audible continuous wave signal of for example 1000 cycles at the second detector 27, it is customary and in fact, very common practice in connection with amateur radio communication, to provide a beat frequency oscillator designated at 30 in the drawing, which could be set to produce a frequency of say 454 or 456 kilocycles so that when heterodyned with the intermediate frequency of 455 kilocycles, it will produce a beat frequency of approximately 1000 cycles. It will be understood that a beat frequency of 2000 cycles, for example, would be just as satisfactory since it is also within the audible range.

Although the signal reproducing device generally indicated at 29 may comprise any suitable

SEARCH ROOM means such, for example, as oral devices comprising headphones, loudspeaker equipment or the like, or visual equipment such as meters, it is preferable in accordance with the present invention to provide a signal reproducing device 29 in the form of an oscilloscope calibrated for frequency on the X or horizontal axis and for amplitude on the Y or vertical axis. The cathode ray tube of such a signal reproducer 29 is designated at 31. In accordance with the present invention, the output of the audio frequency amplifier 28 is connected to the vertical deflecting plates of the oscilloscope 31, the terminals of which are designated at 32. The horizontal deflecting plates of the oscilloscope 31, the terminals of which are designated at 33, are connected to the output of a sweep circuit generally indicated at 34 and comprising a resistor 35 adapted to be swept by a moving contact 36 driven by a sweep motor 37. A suitable battery 38 is adapted to be connected across the resistor 35 with the negative terminal of the battery grounded, as indicated at 39. It is apparent that with this arrangement a potential is applied to the terminals 33 connected to the horizontal deflecting plates of the cathode ray tube 31 which varies from zero to a maximum with each rotation of the sweep motor 37, and in other words causes a luminous line to move along the X axis from zero to the maximum deflection along this axis in a manner well understood by those skilled in the art.

Also in accordance with the present invention, the sweep motor 27 simultaneously controls the position of the tuning means as for example the condenser generally indicated at 40 of the local oscillator 25. This condenser is caused to rotate with each revolution of the sweep motor 37 so as to sweep the wave signal receiver 21 across the frequency band with each revolution of the sweep motor 37. In other words, the wave signal receiver 21 is a sweep tuned receiver sometimes referred to as a panoramic receiver. The variable tuning means, as for example the variable condenser 40 is designed in such a manner that the frequency spectrum is swept only once in 360 degrees rotation thereof.

From the above description it will be apparent that as the sweep motor 37 rotates the tuning means 40 of the local oscillator 25 of the wave signal receiver 21, the receiver 21 will be tuned at various instants to the frequencies of the local oscillators such as 15 of the receivers 10, 11, 12 and the like whereupon a signal is produced in the signal reproducer 29 in the form of a vertical deflection designated as 42 on the oscilloscope 31. If all of the receivers such as 10, 11, and 12 are tuned to the same broadcasting station then all of the local oscillators will be producing high frequency oscillations of the same frequency and the vertical deflection such as 42 will be substantially greater than if only a single receiver were tuned to this particular broadcasting station. As the local oscillator 25 is tuned to different frequencies by the sweep motor 37, a different voltage is applied to the horizontal deflecting plates of the oscilloscope 31 so that it is effectively calibrated for frequency, while the vertical deflecting plates are calibrated for amplitude.

With the arrangement described thus far, it is apparent that the modulated signals from the radio broadcasting stations will be received by the wave signal receiver 21 as the local oscillator 25 is tuned to such frequency, or rather is tuned to a frequency such that the wave signal receiver 21 is effectively tuned to the frequency of a particular broadcasting station. To prevent the modulated signals received by the wave signal receiver 21 from having any effect on the signal reproducer 29, there is provided in accordance with the present invention, a squelch circuit generally indicated at 43 for effectively preventing modulated radio frequency signals from reaching the signal reproducer 29. As illustrated, this squelch circuit comprises a filter 44 connected to the output of the detector 27. The output of the filter 44 is connected to a rectifier 45 through a resistor 46. One terminal of the resistor 46 is grounded, as indicated at 47, while the other terminal of the resistor 46 is connected by means of a lead 48 to the grid or control electrode of an electron discharge valve 49 in the audio frequency amplifier stage 28. The filter 44 is designed so as to reject virtually all of the beat frequency oscillator notes that are injected by virtue of the beat frequency oscillator 30, but substantially passes all other audio frequency energy to the rectifier 45. Consequently whenever audio frequency energy, which is obtained by virtue of the receiving of modulated signals, is passed through filter 44 and rectified by the rectifier 45 so that a direct current voltage appears across resistor 46 there is a consequent application of a negative voltage to the grid of the electron discharge valve 49, thereby cutting off the audio frequency amplifier 28 so that no audible signal appears at the output thereof. With this arrangement it is apparent that the wave signal receiver 21 will not be affected by any modulated signals whereby it can truly receive only the outputs of the local oscillators of receivers disposed in homes adjacent to the position of the wave signal receiver 21, which are being studied.

Instead of eliminating the modulated signals from the wave signal receiver 29 in the preferred embodiment as described above, it is possible to distinguish the signals received from the high frequency oscillators of superheterodyne receivers from the modulated signals from broadcasting stations by virtue of the fact that the former have a constant amplitude as against the varying amplitude of the modulated signals from broadcasting stations. Thus a discrimination between commercial broadcasting signals and the signals from the local oscillators of adjacent radio receivers is made possible by the relative strength of the signals as indicated, for example, by the amplitude of the indications on the cathode ray tube 31 of the signal reproducing device 29, or by the directional characteristics of the received signal, or by the fact that the commercial signals are usually modulated. The last mentioned means of distinguishing these signals is employed in connection with the squelch circuit 43 described above.

It will be apparent that with the wave signal receiver 21 described above, that discreet lines or pips, such as 42, will appear on the oscillograph screen indicating the radio receivers in use. The lines or pips on the screen can be counted to show the number of sets in use and the position of the pips on the screen can be interpreted to indicate the frequency of the high frequency oscillators and consequently can be interpreted to determine the particular broadcasting station to which the receiver is tuned. As was pointed out above, if more than one receiver is tuned to the same frequency, the size of the pips such as 42, will vary and by properly calibrating the wave signal receiver 21 in a particular locality, it is readily possible to determine the number of receivers which are turned on and the particular radio broadcasting stations to which those receivers are tuned.

In view of the detailed description included above, the operation of the wave signal receiver 21 in determining the listening habits of radio receiver users will be understood. Essentially the wave signal receiver 21 is capable of picking up and identifying the energy radiated by the high frequency local oscillators such as 15, of superheterodyne radio receivers. As the sweep motor 37 rotates the movable arm 36 associated with the resistor 35 and also the rotor of the condenser 40 associated with the local oscillator 25, the receiver 21 is swept across the tuning range so that the signal reproducer 29 indicates the various high frequency local oscillators which are radiating radio frequency energy received by the receiver 21. Wave signal receiver 21 may be beamed at a particular home, as by employing a directional antenna 22. This would be satisfactory where mobile equipment is used and the wave signal receiver is moved past various homes toward which the directional antenna is beamed. It will be apparent that the wave signal receiver 21 described above, whether associated with mobile equipment or in the form of a permanent installation permits observation of home listening data exteriorly from the homes being studied and with no disturbance or collaboration as far as the people in the studied homes are concerned. The advantages of such an arrangement are apparent to those skilled in the art of marketing research. Furthermore, the apparatus, as illustrated, is in very simple and compact form and of fairly inexpensive construction.

It will be apparent to those skilled in the art that the present invention is not limited to the particular construction shown but that changes and modifications may be made without departing from the spirit and scope of the present invention, and it is aimed in the appended claims to cover all such changes and modifications.

What is claimed as new and desired to be secured by Letters Patent of the United States is:

1. A panoramic wave signal receiver for determining the particular radio transmitting station to which one or more superheterodyne radio receivers remote from said wave signal receiver are tuned whereby the listening habits of the users of said radio receivers may be determined, comprising means for receiving the unmodulated signals radiated from the local oscillators of said one or more superheterodyne receivers, a beat frequency oscillator for rendering said unmodulated signals audible, a signal reproducer for indicating the frequency or frequencies of the radiated signals from said local oscillator or oscillators whereby the transmitting station or stations to which said receiver or receivers are tuned may be determined, and a squelch circuit including a filter for by-passing modulated signals to prevent said modulated signals from affecting said signal reproducer.

2. A panoramic wave signal receiver for determining the particular radio transmitting station to which one or more superheterodyne receivers remote from said wave signal receiver are tuned whereby the listening habits of the users of said radio receivers may be determined, comprising means for receiving the unmodulated signals radiated from the local oscillators of said one or more superheterodyne receivers, a beat frequency oscillator for rendering said unmodulated signals audible, a signal reproducer for indicating the frequency or frequencies of the radiated signals from said local oscillator or oscillators whereby the transmitting station or stations to which said receiver or receivers are tuned may be determined, and a squelch circuit including a filter for by-passing modulated signals, a rectifier connected to the output of said filter, and biasing means associated with said filter and rectifier for preventing audio signals obtained from the reception of modulated signals from affecting said signal reproducer.

HENRY A. RAHMEL.

REFERENCES CITED

The following references are of record in the file of this patent:

UNITED STATES PATENTS

| Number | Name | Date |
|---|---|---|
| 2,063,610 | Linsell | Dec. 8, 1936 |
| 2,152,515 | Wheeler | Mar. 28, 1939 |
| 2,188,165 | Thomas | Jan. 23, 1940 |
| 2,213,886 | Potter | Sept. 3, 1940 |
| 2,265,868 | Schonland | Dec. 9, 1941 |
| 2,281,982 | Leyn | May 5, 1942 |
| 2,312,203 | Wallace | Feb. 23, 1943 |
| 2,354,836 | Rusch | Aug. 1, 1944 |
| 2,370,216 | Worcester | Feb. 27, 1945 |
| 2,392,672 | Koch | Jan. 8, 1946 |
| 2,404,338 | Worcester | July 16, 1946 |
| 2,408,791 | Magnuski | Oct. 8, 1946 |
| 2,412,991 | Labin | Dec. 24, 1946 |
| 2,418,750 | Bliss et al. | Apr. 8, 1947 |
| 2,427,670 | Goldsmith | Sept. 23, 1947 |
| 2,445,562 | Cawein et al. | July 20, 1948 |
| 2,447,392 | Byrne | Aug. 17, 1948 |
| 2,465,500 | Wallace et al. | Mar. 29, 1949 |
| 2,483,573 | Clark | Oct. 4, 1949 |